US008085642B2

(12) United States Patent
Kim et al.

(10) Patent No.: US 8,085,642 B2
(45) Date of Patent: Dec. 27, 2011

(54) SERVO CONTROLLING APPARATUS AND METHOD OF HOLOGRAPHIC INFORMATION RECORDING/REPRODUCING SYSTEM

(75) Inventors: Sung-hyun Kim, Yongin-si (KR); Jae-cheol Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 584 days.

(21) Appl. No.: 12/170,589

(22) Filed: Jul. 10, 2008

(65) Prior Publication Data

US 2009/0175138 A1  Jul. 9, 2009

(30) Foreign Application Priority Data

Jan. 7, 2008 (KR) ............... 10-2008-0001863

(51) Int. Cl.
*G11B 7/00* (2006.01)
(52) U.S. Cl. ............... 369/103; 369/94; 369/53.28
(58) Field of Classification Search .......... 369/103, 369/94, 53.23, 53.28, 44.11, 44.35, 44.37
See application file for complete search history.

(56) References Cited

U.S. PATENT DOCUMENTS

| | | | |
|---|---|---|---|
| 6,992,965 B1* | 1/2006 | Glushko et al. | 369/103 |
| 2005/0030875 A1* | 2/2005 | Horimai | 369/103 |
| 2005/0135217 A1* | 6/2005 | Tateishi et al. | 369/103 |
| 2007/0047421 A1* | 3/2007 | Usami | 369/103 |
| 2007/0109944 A1 | 5/2007 | Shimokawa | |
| 2007/0153344 A1* | 7/2007 | Lin et al. | 359/25 |
| 2008/0130430 A1* | 6/2008 | Minabe et al. | 369/44.23 |
| 2008/0285392 A1* | 11/2008 | Fukushima | 369/44.11 |

FOREIGN PATENT DOCUMENTS

| | | |
|---|---|---|
| KR | 10-578200 | 5/2006 |
| KR | 2007-767931 | 10/2007 |
| WO | WO 2007/026483 | 3/2007 |

OTHER PUBLICATIONS

Search Report and Written Opinion issued by the International Searching Authority in International Patent Application No. PCT/KR2008/004791 on Feb. 24, 2009.

* cited by examiner

*Primary Examiner* — Wayne Young
*Assistant Examiner* — Thomas Alunkal
(74) *Attorney, Agent, or Firm* — NSIP Law

(57) ABSTRACT

A servo controlling apparatus of a holographic information recording/reproducing system changes the foci of reference light and signal light in a depth direction of a holographic information storage medium to record information over a plurality of information layers. A servo control is changed from a normal servo operation to a between-movement servo operation while movement between information layers is made during a recording operation, and the servo control is changed back to the normal servo operation when the movement between information layers is completed. The between-movement servo operation maintains a servo control state that exists before the movement between information layers.

17 Claims, 12 Drawing Sheets

SERVO CONTROLLING APPARATUS AND METHOD OF HOLOGRAPHIC INFORMATION RECORDING/REPRODUCING SYSTEM

CROSS-REFERENCE TO RELATED PATENT APPLICATION

This application claims the benefit of Korean Patent Application No. 2008-1863, filed on Jan. 7, 2008 in the Korean Intellectual Property Office, the disclosure of which is incorporated herein in its entirety by reference.

BACKGROUND OF THE INVENTION

1. Field of the Invention

Aspects of the present invention relate to a servo controlling apparatus and method of a holographic information recording/reproducing system. More particularly, aspects of the present invention relate to a servo controlling apparatus and method of a holographic information recording/reproducing system that provide a more stable control between movements during a recording operation on a plurality of layers.

2. Description of the Related Art

Recently, information storing technology that uses a hologram has been in the limelight. An information storing method using a hologram stores information in the form of an optical interference pattern in an inorganic crystal or a photo polymer material sensitive to light. The optical interference pattern is formed using two laser beams having an interference characteristic. That is, an interference pattern formed when a reference light and a signal light having different paths, respectively, interfere with each other generates a chemical or physical change on a photosensitive storage medium to record information. To reproduce the information from the interference pattern recorded in this way, reference light similar to the light that was used when the information was recorded is illuminated onto the interference pattern recorded in the storage medium. When the reference light is illuminated onto the interference pattern, diffraction caused by the interference pattern is generated such that the signal light is recovered and the recorded information is reproduced. The hologram information storing technology includes a volume holography method in which information is recorded and reproduced on a page unit basis using volume holography, and a micro holography method in which information is recorded and reproduced on a single bit basis using micro holography. In the volume holography method, large scale information is processed simultaneously, but in this case, it is desirable to control the optical system very precisely. Therefore, the volume holography method has been too difficult to be commercialized as an information storing apparatus for general consumers.

On the other hand, in the micro holography method, two condensed beams interfere with each other at a focal point to form a fine interference pattern. The focal lengths of the two condensed beams are moved on the plane of a storage medium to form a plurality of interference patterns such that information is recorded on one information layer. Further, in the micro holography method, a plurality of information layers are formed in the depth direction of the storage medium such that information is recorded three-dimensionally in a storage medium. To record information over multiple layers, a signal light optical system moves a focus at which the signal light is condensed in the depth direction, and simultaneously, a reference light optical system moves a focus at which reference light is condensed to the same position. However, according to a conventional micro holographic recording/reproducing system, disturbance is generated in the optical pickup control in radial and tangential directions when the foci of the reference light and the signal light change between information layers on which information is recorded, so that the foci of the reference light and the signal light deviate from each other.

SUMMARY OF THE INVENTION

Aspects of the present invention provide an apparatus and method for a holographic information recording/reproducing system that can stably control a reference light and a signal light during movement between information layers.

According to an aspect of the present invention, there is provided a servo controlling apparatus of a holographic information recording/reproducing system that changes foci of a reference light and a signal light in a depth direction of a holographic information storage medium to record information over a plurality of information layers, wherein the servo controlling apparatus changes a servo control from a normal servo to a between-movement servo while movement between information layers is made during a recording operation, and changes the servo control is changed back to the normal servo when the movement between information layers is completed. The between-movement servo maintains a servo control state that exists immediately before the movement between information layers.

According to an aspect of the present invention, the servo controlling apparatus may include: a servo signal detecting unit that detects a servo signal; and a signal processing unit that outputs a between-movement servo control signal using a before-movement servo signal detected by the servo signal detecting unit during the movement between information layers.

According to an aspect of the present invention, the servo controlling apparatus may include: a servo signal detecting unit that detects a servo signal; and a servo control unit that controls a servo using the servo signal detected by the servo signal detecting unit, the servo control unit including a normal controller that controls a servo inside a same information layer during a recording operation, and a between-movement controller that controls a servo during the movement between information layers.

According to another aspect of the present invention, there is provided a servo controlling method of a holographic information recording/reproducing system, that changes foci of reference light and signal light in a depth direction of a holographic information storage medium to record information over a plurality of information layers, the method comprising changing a servo control from a normal servo to a between-movement servo while movement between information layers is made during a recording operation, and changing the servo control back to the normal servo when the movement between information layers is completed. The between-movement servo maintains a servo control state that exists immediately before the movement between information layers.

According to an aspect of the present invention, the servo control may be for a radial direction and/or a servo for a tangential direction.

The servo controlling apparatus and method of a holographic information recording/reproducing system stably performs an optical pickup servo control in radial and/or tangential directions during movement between information layers, thereby allowing swift and stable movement between information layers.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
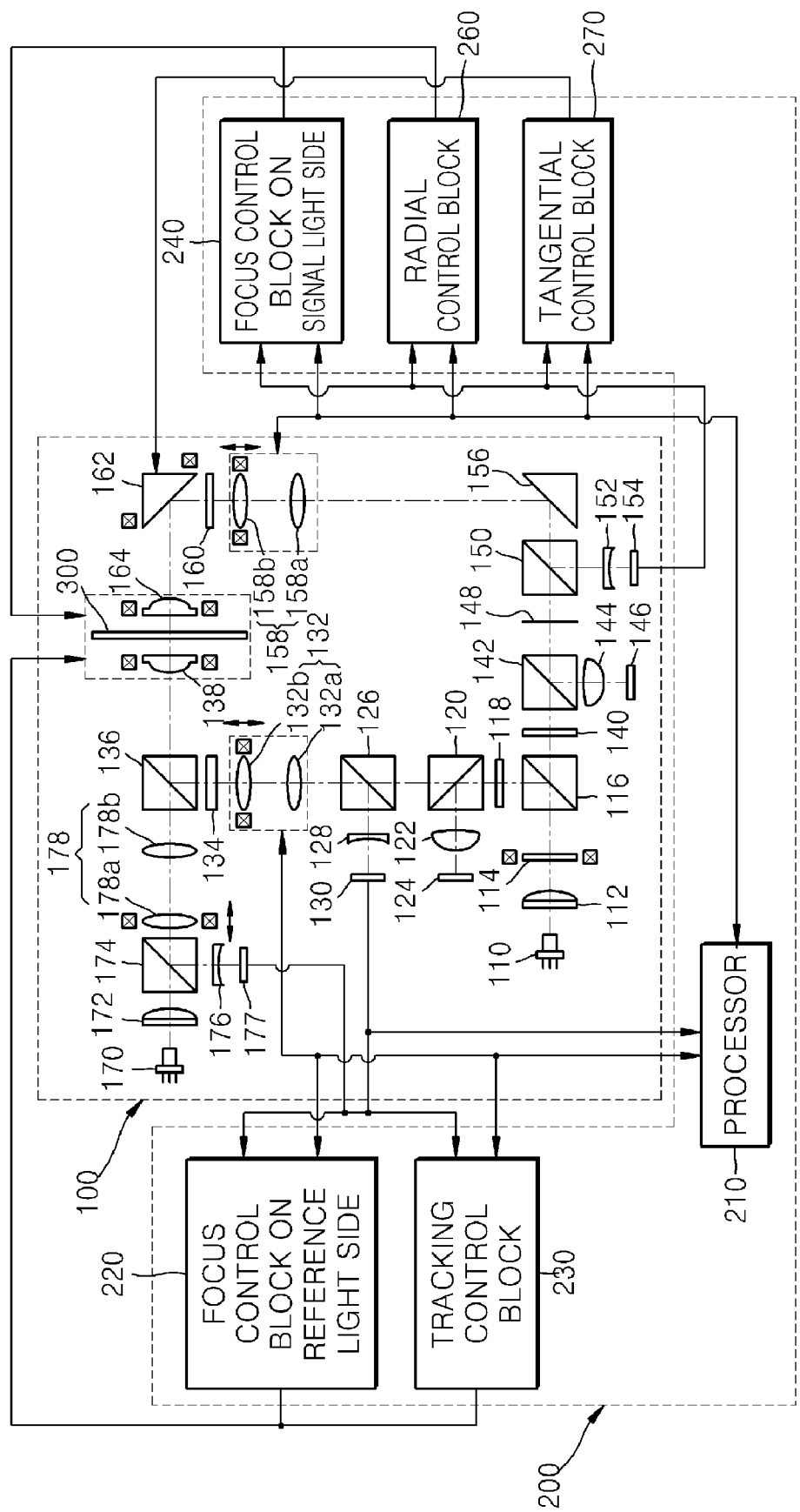
FIG. 1 is a schematic view of the construction of a holographic information recording/reproducing system according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a schematic view of the construction of a holographic information recording/reproducing system according to an embodiment of the present invention. The holographic information recording/reproducing system, which is an apparatus that records and/or reproduces information to/from a holographic information storage medium 300, includes a recording/reading optical system 100 that illuminates light onto both sides of the holographic information storage medium 300 and receives the illuminated light, and a servo control unit 200.

The recording/reading optical system 100 includes a first light source 110, a polarization conversion device 114, a first polarization beam splitter 116, a second polarization beam splitter 126, a first light detector 130, a first focus control unit 132, a wavelength selective beam splitter 136, a first quarter-wave plate 134, a first objective lens 138, a shutter 148, a third polarization beam splitter 150, a second light detector 154, a second focus control unit 158, a second quarter-wave plate 160, a movable mirror 162, and a second objective lens 164. Also, the recording/reading optical system 100 includes a second light source 170, a servo light polarization beam splitter 174, a servo light focus control unit 178, and a servo light detector 177 in order to read servo information. Additionally, the recording/reading optical system 100 includes a first polarization device 118 that detects the intensities of the reference light and the signal light during a recording operation, a reference beam splitter 120, a reference light detector 124, a second polarization device 140, a signal beam splitter 142, and a signal light detector 146. Reference numerals 112 and 172 represent collimating lenses that collimate light into parallel light. Reference numerals 122, 128, 144, 152, and 176 represent lenses that facilitate light detection. Reference numerals 156 and 162 represent mirrors that bend a light path. While a particular configuration of the optical system 100 is shown, it is to be understood that the invention is not limited thereto.

The first light source 110 emits linearly polarized light in one direction for recording/reproducing operations. As a non-limiting example, the first light source 110 may be a semiconductor laser diode that emits blue light. The light for the recording/reproducing operations emitted from the first light source 110 is modulated and emitted during a recording mode, and emitted without modulation during a reproducing mode.

The polarization conversion device 114 is an active type polarization device that polarizes light during a recording operation such that the light has linearly polarized components perpendicular to each other and polarizes light during a reproducing mode such that the light has a linearly polarized component in one direction. During the recording mode, the p-polarized component and s-polarized component of the polarized light correspond to the reference light and the signal light, respectively. During the reproducing mode, the transmitted light, (i.e., p-polarized light) corresponds to the reproducing light. Descriptions of specific polarization directions are made herein with the assumption that the reference light and the reproducing light are p-polarized, for convenience in description.

The polarization conversion device 114 can be a rotatable half-wave plate or a liquid crystal type active half-wave plate. For example, in the case where the polarization conversion device 114 is a rotatable half-wave plate, an angle between the optical axis (i.e., the fast axis of the rotatable half-wave plate and the polarization direction of incident light) is set to a value excluding 45 degrees (such as, for example, 22.5 degrees), during a recoding mode. During a reproducing mode, the fast axis of the rotatable half-wave plate is set to be the same as the polarization direction of the incident light. Therefore, during the recording mode, light emitted from the first light source 110 is polarized to have a p-polarization and an s-polarization, for example. During the reproducing mode, light emitted from the first light source 110 is set to maintain its original polarization. Furthermore, the ratio of the polarized components of the incident light perpendicular to each other is controlled by fine controlling the optical axis of the rotatable half-wave plate. As the polarization component ratio is controlled as described above, the intensities of the reference light and the signal light branching from the first polarization beam splitter 116 can be controlled.

The first polarization beam splitter 116 can transmit or reflect light depending on its polarization direction. For example, the first polarization beam splitter 116 can transmit s-polarized light and reflect p-polarized light. Accordingly, the first polarization beam splitter 116 can reflect a reference light having a p-polarization and transmit a signal light having a s-polarization to separate light paths of the reference light and the signal light during the recording mode.

The first polarization device 118, the reference beam splitter 120, and the reference light detector 124 form a recording power detecting unit with respect to the reference light. The second polarization device 140, the signal beam splitter 142, and the signal light detector 146 form a recording power detecting unit with respect to the signal light. The first and second polarization devices 118 and 140 change a portion of the polarized component of incident light into a polarized component perpendicular to that of the incident light. For example, each of the first and second polarization devices 118 and 140 can be a half-wave plate. For example, the optical axis of the half-wave plate can be disposed to slightly deviate from the polarization direction of the incident light to change a portion of the incident light into light having a polarized component perpendicular to the polarization of the incident light. Each of the reference beam splitter 120 and the signal beam splitter 142 can be a polarization beam splitter. The intensities of the reference light and the signal light branching from the first polarization beam splitter 116 can be known using the intensities of reference light and signal light detected by the reference light detector 124 and the signal light detector 146.

The second polarization beam splitter 126 guides the reference light reflected by the holographic information storage medium 300 to the first light detector 130. The reference light reflected by the holographic information storage medium 300 changes its polarization direction while passing through the quarter-wave plate 134, and may be separated from the reference light coming from the first light source 110 at the second polarization beam splitter 126.

The first light detector 130 detects the reference light reflected by the holographic information storage medium 300. The focus information of the reference light can be known from a signal of the reflected reference light. Furthermore, reproducing light reflected by the holographic information storage medium 300 can be detected at the first light detector 130 during a reproducing mode.

The first and second focus control units 132 and 158 are disposed on the light paths of the branching reference light and signal light, respectively. The first and second focus control units 132 and 158 may be active type relay lens units. The active type relay lens unit includes, for example, a plurality of lenses 132a (158a) and 132b (158b). At least one lens 132b (158b) is movably installed in an optical axis direction and driven by a driving unit (not shown). The first focus control unit 132 changes the focus position of the reference light focused by the objective lens 138 on the holographic information storage medium 300 to allow the focus of the reference light to be formed at different positions in the depth direction inside the holographic information storage medium 300. Likewise, the second focus control unit 158 changes the focus position of the objective lens 164 with respect to the signal light to allow the focus of the signal light to be formed at different positions in the depth direction inside the holographic information storage medium 300. When the foci of the reference light and the signal light are formed at different positions along the depth direction of the holographic information storage medium 300, an information layer on which information is written can be formed in a plurality of layers.

The first and second quarter-wave plates 134 and 160 change linearly polarized light into circularly polarized light and vice versa. The first and second quarter-wave plates 134 and 160 separate light for recording/reproducing operations incident onto the holographic information storage medium 300 and light for recording/reproducing operations reflected by the holographic information storage medium 300.

The wavelength selective beam splitter 136 couples a servo optical system to the recording/reproducing optical system 100. The wavelength selective beam splitter 136 serves as a dichroic mirror that functions as a simple mirror with respect to a wavelength of the first light source 110 (that is, light for recording/reproducing operations) and simply transmits a wavelength of the second light source 170 described later, that is, a servo light.

The shutter 148 is a member that blocks the signal light so that the signal light branching from the first polarization beam splitter 116 is not incident onto the holographic information storage medium 300 while the optical system 100 on the signal light side is being servo-controlled before a recording operation is performed in a recording mode.

The third polarization beam splitter 150 guides a reference light component generated by the first light source 110 that has passed through the holographic information storage medium 300 to the second light detector 154 while the optical system on the signal light side is being servo-controlled before a recording operation is performed in a recording mode. The second light detector 154 detects a signal of the reference light component that has passed through the holographic information storage medium 300, and transmits the detected signal to a focus control block 240 on the signal light side, a radial control block 260, a tangential control block 270, and a processor 210. The transmitted signals facilitate a servo control of the focus position on the signal light side, as described later.

The movable mirror 162 is a mirror that can rotate minutely to control the tangential direction of the signal light. The movable mirror 162 is controlled by the tangential control block 270 to allow the focus position of signal light to coincide with that of the reference light.

The first and second objective lenses 138 and 164 condense light for recording/reproducing operations or servo light onto a predetermined region of the holographic information storage medium 300. The first and second objective lenses 138 and 164 can change the foci of the reference light and the signal light formed inside the holographic information storage medium 300 in cooperation with the first and second focus control units 132 and 158, and further make the aperture number of the optical system with respect to the reference light different from the aperture number of the optical system with respect to the signal light. For example, a tolerance can be sufficiently secured at least when the optical system for a signal light side is designed by making the aperture number of the optical system relatively large with respect to the signal light.

Next, the servo optical system is described. The second light source 170 emits servo light, that is, light that is used to determine and guide the positioning of the foci of the signal light and the reference light. As a non-limiting example, the second light source 170 can be a semiconductor laser diode that emits red light. The second light source 170 may emit linearly polarized light in one polarization direction.

The servo light polarization beam splitter 174 separates light from the second light source 170 into servo light incident onto the holographic information storage medium 300 and servo light reflected by the holographic information storage medium 300 using a polarization direction.

The servo light focus control unit 178 varies the focus position of the servo light inside the holographic information storage medium 300 along the depth direction. The servo light focus control unit 178 can be a relay lens unit including a plurality of lenses 178a and 178b as shown, or can be otherwise realized.

A detecting lens 176 allows a light spot of reflected servo light to be properly formed on the servo light detector 177. For example, the detecting lens 176 can be an astigmatism lens detecting a focus error signal using an astigmatism method.

The servo light detector 177 includes a plurality of light detectors to detect servo information and a servo error signal contained on the servo layer of the holographic information storage medium 300. The detected servo information and server error signal are sent to a focus control block 220 on the reference light side, a tracking control block 230, and the processor 210, which are part of a servo control unit 200 that controls the focus of servo light and performs a general servo control operation of the optical pickup during recording/reproducing operations.

Next, the servo control unit 200 according to the embodiment will be described below. The servo control unit 200 includes the processor 210, the focus control block 220 on the reference light side, the tracking control block 230, the focus control block 240 on the signal light side, the radial control block 260, and the tangential control block 270. It is to be understood that the blocks 220, 230, 240, 260 and 270 can be realized using one or more processors in addition to or including the processor 210.

The processor 210 controls the first object lens 138 and the servo light focus control unit 178 so that the focus of the servo light is formed on the servo layer 320 (of FIG. 2) inside the holographic information storage medium 300 using a detection signal input from the servo light detector 177. Also, the processor 210 controls the first and second objective lenses 138 and 164 to be located on a correct track position inside the holographic information storage medium 300 using servo information obtained from the servo light, and controls the first and second focus control units 132 and 158 so that the foci of the reference light and the signal light are formed on a position from which recording/reproducing operations are to be performed. At this point, this operation can be referred to as a static servo control in that the positions of the reference light and the signal light are determined by a process determined in advance using the servo light.

However, since the holographic information storage medium 300 undergoes various forms of shaking while rotating, a servo control to adjust for the shaking is desirable. Particularly, a between-movement servo control (i.e., a dynamic servo control) is desirable to correct dynamic movements caused by the rotation of the holographic information storage medium 300 under a dynamic circumstance such as movements between information layers on which a recording operation is to be performed.

Each control block (i.e., blocks 220, 230, 240, 260, 270) according to the embodiment obtains a signal for a dynamic servo control from light reflected by the holographic information storage medium 300 and light passing through the holographic information storage medium 300 after illumination onto the holographic information storage medium 300. Under the dynamic circumstance, the shutter 148 is closed to block the signal light so that the first and second light detectors 130 and 154 can exclude interference by a signal of the signal light. Since the power of the reference light is for a servo function, the light power of the reference light is set to be lower than the light power required for a recording operation. The focus control block 220 on the reference light side detects the reference light reflected by the holographic information storage medium 300 through the first light detector 130 and controls the first focus control unit 132 using the detected reference light. Since the reference light reflected by the holographic information storage medium 300 has information as to whether the focus of the reference light is formed at a recording position, the focus control block 220 on the reference light side allows the focus of the reference light to be formed at the recording position inside the holographic information storage medium 300 under the dynamic circumstance.

The tracking control block 230 controls the first objective lens 138 to correctly trace a track to be read inside the holographic information storage medium 300 under a dynamic circumstance. For this purpose, the tracking control block 230 obtains a servo error signal from the reference light reflected by the holographic information storage medium 300 as to how much the reference light deviates from a recording track and performs a tracking operation on the basis of the obtained servo error signal.

The focus control block 240 on the signal light side controls the second focus control unit 158 so that the focus of the signal light coincides with that of the reference light on the basis of a signal of reference light that has passed through the holographic information storage medium 300. The signal of reference light that has passed through the holographic information storage medium 300 is detected by the second light detector 154. Since the signal of reference light contains information regarding the focus position of the reference light and the position of the second objective lens 162, the focus position of the signal light to be condensed via the second objective lens 162 can be estimated. Accordingly, the degree by which the focus position of the signal light deviates from the focus position of the reference light in the depth direction, the radial direction, and the tangential direction can be known. The focus control block 220 on the reference light side and the focus control block 240 on the signal light side obtain servo information that can control the foci of reference light and signal light under a dynamic circumstance from a signal of the reference light that has been reflected or passed through the holographic information storage medium 300 to control the first and second focus control units 132 and 158.

The radial control block 260 controls the second objective lens 164 using the signal of the reference light that has passed through the holographic information storage medium 300 to perform a radial direction servo on signal light. A more detailed description of the radial control block 260 is provided later.

The tangential control block 270 drives the movable mirror 162 on the basis of the reference light that has passed through the holographic information storage medium 300 to perform a tangential direction servo on signal light. A more detailed description of the tangential control block 270 is provided later.

Figure 2:
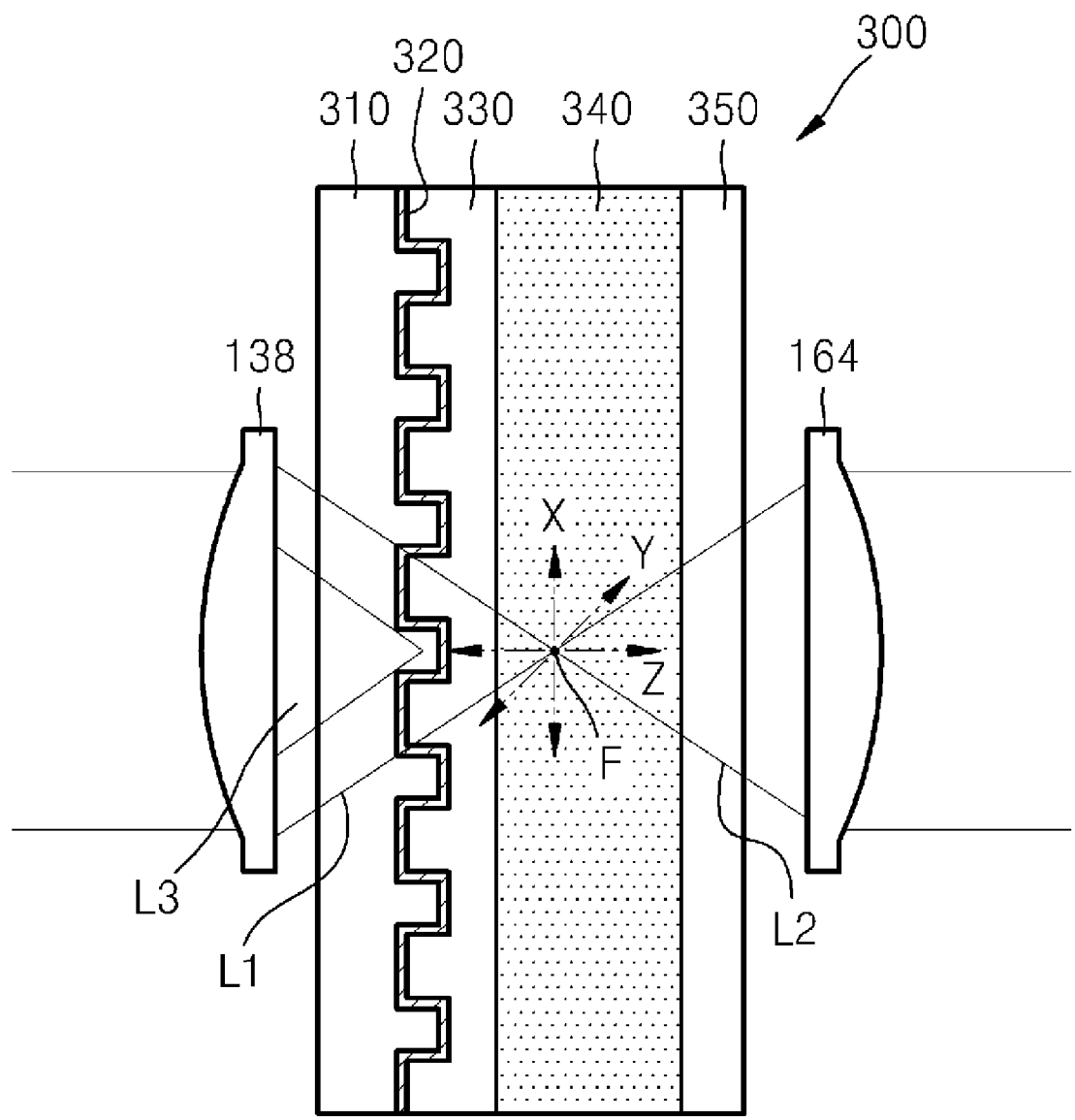
FIG. 2 is a reference view illustrating a servo according to a change in the focus positions of the reference light and the signal light in the holographic information recording/reproducing system.

Next, a servo according to a change in the foci of the signal light and the reference light is described with reference to FIG. 2. The holographic information storage medium 300 used for the holographic information recording/reproducing system according to the embodiment of FIGS. 1 and 2 is a two-sided illumination type medium including transparent first and second substrates 310 and 350, a servo layer 320, a buffer layer 330, and a recording layer 340. In FIG. 2, an X-direction represents the radial direction of the holographic information storage medium 300, a Y-direction represents the tangential direction of the holographic information storage medium 300, and a Z-direction represents the focus direction (i.e., the depth direction) of the holographic information storage medium 300. The reference light L1 and the signal light L2 face each other and are incident to the holographic information storage medium 300 to form a focus F on one region of the recording layer 340. The servo light L3 is incident to a plane to which the reference light L1 is incident to form a focus on the servo layer 320.

In the operation process of the recording mode of the holographic information recording/reproducing system according to the embodiment of FIGS. 1 and 2, the servo light L3 is illuminated to perform a static servo. The servo light focus control unit 178 is controlled using a signal of the servo light L3 reflected by the servo layer 320 of the holographic information storage medium 300 to allow the focus of the servo light to be formed on the servo layer 320. Next, the first and second objective lenses 138 and 164, and the first and second focus control units 132 and 158 are controlled so that the foci of the reference light L1 and the signal light L2 are formed at a correct track position inside the holographic information storage medium 300 on the basis of servo information obtained from the servo light.

However, the foci of reference light L1 and signal light L2 can deviate from each other during the static servo operation. For example, the foci of the reference light L1 and the signal light L2 can deviate in the focus direction (i.e., the Z direction) due to shaking in the surface direction of the holographic information storage medium 300. Also, the two foci can deviate from each other in the radial direction (i.e., the X direction) due to shaking in the radial direction of the holographic information storage medium 300 (that is, shaking caused by eccentricity). Also, the two foci can deviate from each other in the tangential direction (i.e., the Y direction) due to shaking in the tangential direction of the holographic information storage medium 300 (that is, shaking caused by tilting). Therefore, a dynamic servo control is desirable to correct dynamic movement caused by rotation of the holographic information storage medium 300 under a dynamic circumstance such as movements between information layers on which a recording operation is to be performed.

To correct the deviation of the two foci under the dynamic circumstance, the first light source 110 is driven to illuminate the reference light L1 onto the holographic information storage medium 300 and perform a dynamic servo operation. Since the driving of the light source 110 at this point is directed to driving a servo, the intensity of the light emitted from the first light source 110 is set to be lower than the intensity of light of a recording operation, and the shutter 148 is closed to block disturbance by signal light L2. The reference light L1 is focused on the recording layer 340 and is partially reflected and partially transmitted. The reflected portion of the reference light L1 is detected by the first light detector 130, so that information regarding the focus position of the reference light L1 is obtained. The first focus control unit 132 is controlled on the basis of this information to allow the focus of the reference light L1 to be formed on a recording position. Also, the transmitted portion of the reference light L1 is detected by the second light detector 154. Not only information regarding the focus of the reference light L1 but also information regarding the position of the optical system on the signal light side (that is, the second objective lens 164 or the second focus control unit 158) can be obtained from a signal of the detected reference light L1. Therefore, a servo operation is performed on the optical systems on the reference light side and the signal light side on the basis of a signal of the reflected or transmitted reference light to allow the focus of the signal light L2 to coincide with that of the reference light L1. When the foci of the reference light L1 and the signal light L2 coincide with each other, the shutter 148 is opened, the intensity of the first light source 110 is increased to a value for a recording operation, and the recording operation starts.

For example, shaking such as may be caused by eccentricity of the holographic information storage medium 300 may occur, so that the two foci of reference light L1 and signal light L2 may deviate in the radial X direction. To correct this deviation, the radial control block 260 controls the second objective lens 164 to allow the focus of the signal light L2 that deviates in the radial X direction to coincide with the focus of the reference light L1.

As another example, the two foci of the reference light L1 and the signal light L2 may deviate in the tangential Y direction due to tilting of the holographic information storage medium 300. To correct this deviation, the tangential control block 270 controls the movable mirror 162 to allow the focus of signal light L2 that deviates in the tangential direction to coincide with the focus of the reference light L1.

Particularly, the foci of the reference light L1 and the signal light L2 may drastically or remarkably deviate from each other in the radial X direction or the tangential Y direction due to disturbance during movement between the information layers. A dynamic focus control can be stably performed through the radial control block 260 or the tangential control block 270.

Figure 3:
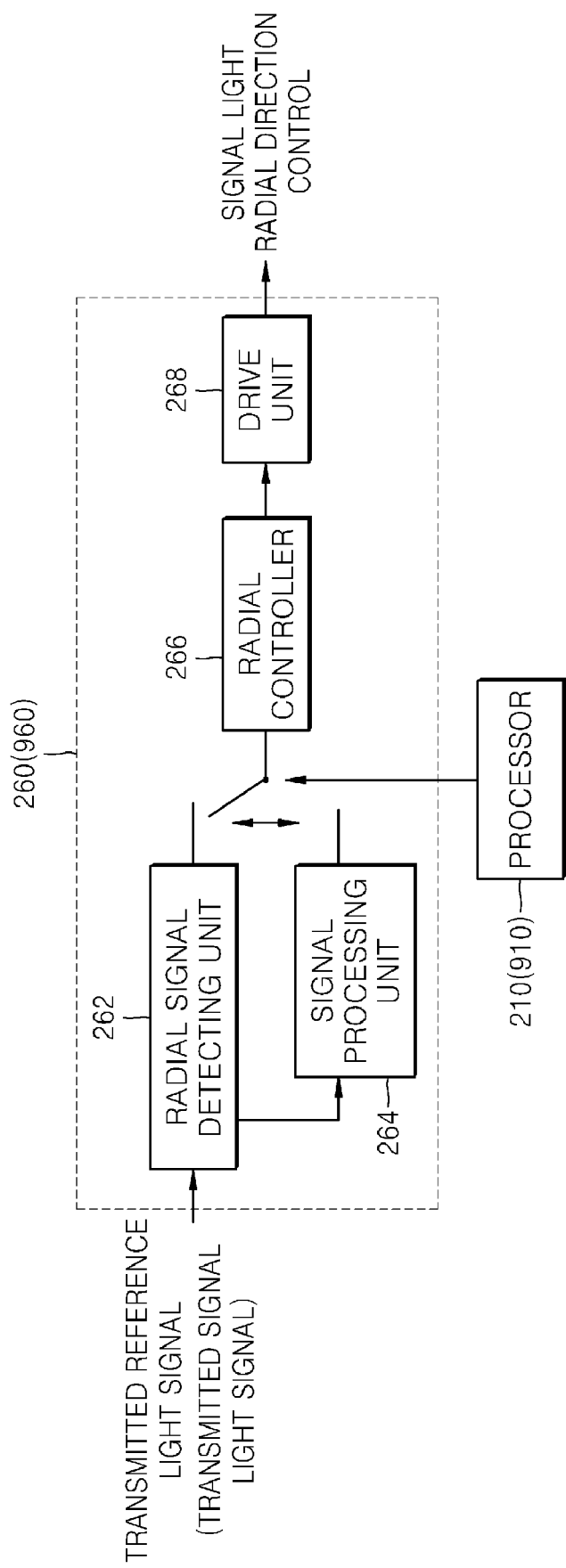
FIG. 3 is a block diagram illustrating a radial control block in the holographic information recording/reproducing system of FIG. 1 according to an embodiment.
Figure 4:
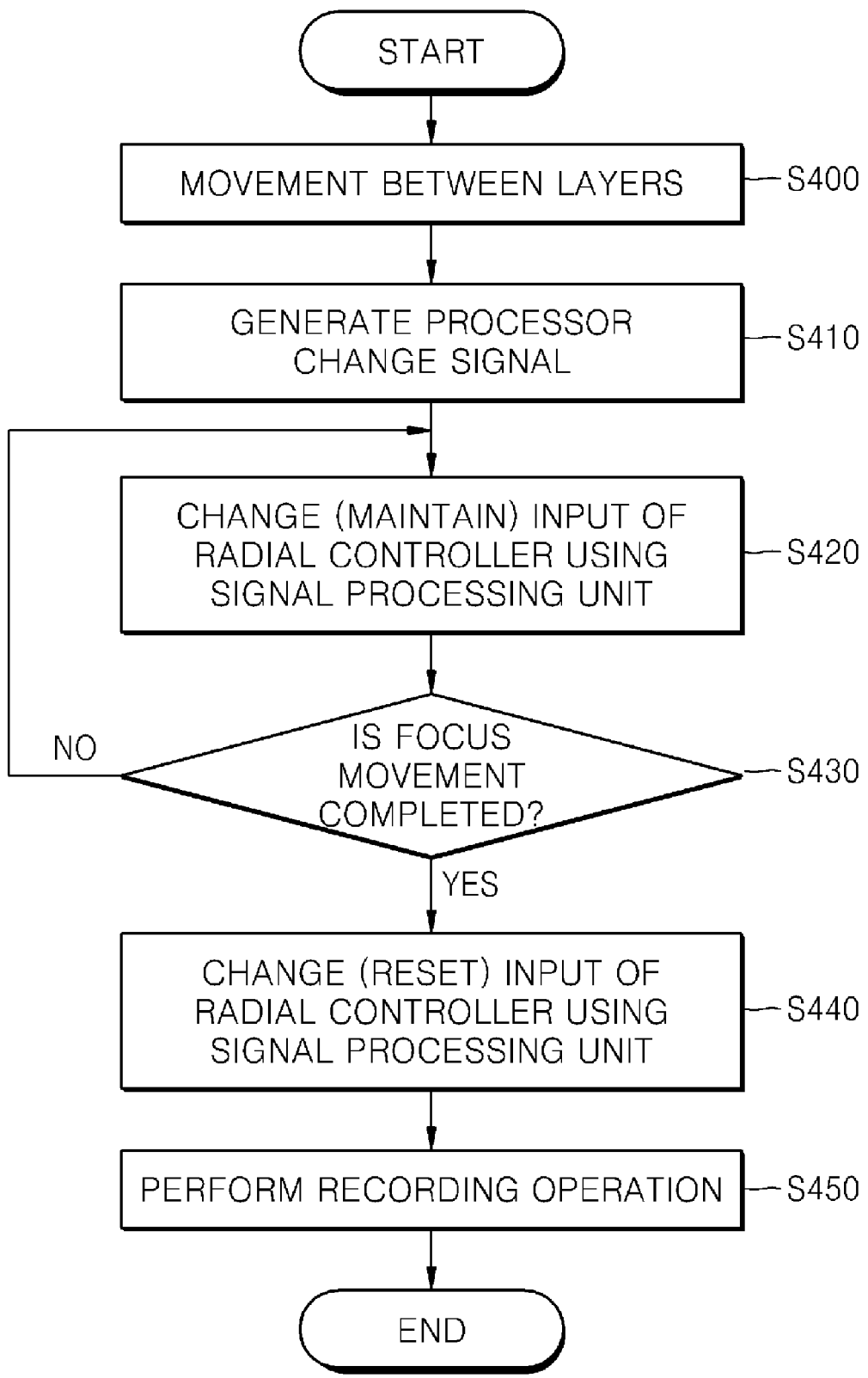
FIG. 4 is a flowchart illustrating a method of controlling a servo of a radial direction when the radial control block of FIG. 3 is used.

An example of the radial control block 260 is described with reference to FIGS. 3 and 4. FIG. 3 is a block diagram illustrating the radial control block 260, and FIG. 4 is a flowchart illustrating a method of controlling a radial direction servo. Referring to FIG. 3, the radial control block 260 controls particularly the focus of the signal light in the radial direction when controlling the focus of the signal light to coincide with the focus of the reference light set in advance. The shown radial control block 260 includes a radial signal detecting unit 262, a signal processing unit 264, a radial controller 266, and a drive unit 268, but is not limited thereto.

The radial signal detecting unit 262 detects a reference light signal that has passed through the holographic information storage medium 300 (of FIG. 1) to output a servo control signal in the radial direction. The radial signal detecting unit 262 directly inputs a servo control signal in the radial direction based on the transmitted reference light signal to the radial controller 266 while a recording operation is performed within a single information layer. However, when movement between information layers on which a recording operation is to be made is performed, the movement of the reference light starts first. Since the movement of the reference light between the layers may involve a drastic signal change, a general radial direction servo control signal based on the reference light may be directly influenced by disturbance. Therefore, when movement between information layers is made during a recording mode, the processor 210 generates a change signal and performs a switching operation so that a signal output from the radial signal detecting unit 262 may be input to the radial controller 266 via the signal processing unit 264.

The signal processing unit 264 converts a servo control signal in the radial direction output from the radial signal detecting unit 262 into a between-movement radial direction servo control signal using a before-movement radial direction servo control signal, and outputs the same. Herein, the term "between-movement radial direction servo control signal" refers to a signal that maintains a servo control state that exists immediately before the movement between information layers. The between-movement radial direction servo control signal can be a right-before-movement radial direction servo control signal, or an average before-movement radial direction servo control signal. The between-movement radial direction servo control signal becomes a stable signal regardless of any disturbance that may occur during movement between information layers.

Next, the radial controller 266 controls the drive unit 268 using an input servo control signal. Since the radial controller 266 receives a stable servo control signal even during movement between information layers, it can stably control the drive unit 268. The drive unit 268 drives the objective lens 164 to perform a servo control in the radial direction of the signal light. Stable movement between information layers can be stably performed without a reaction to a disturbance signal that may occur during movement between information layers by using the signal processing unit 264 during the movement between the layers.

Next, a radial direction servo control method is briefly described using the radial control block 260 with reference to FIGS. 3 and 4.

When the focus of the reference light is moved between information layers to change an information layer on which a recording operation is to be performed (S400), the processor 210 delivers a change signal containing between-movement information to the radial control block 260 (S410). The radial control block 260 that has received the change signal performs a switching operation such that a signal output from the radial signal detecting unit 262 is input to the radial controller 266 via the signal processing unit 264 (S420). The switching operation is maintained until the focus movement is completed (S430). Next, when the focus movement is completed, the radial control block 260 resets a signal output from the radial signal detecting unit 262 such that the signal is directly input to the radial controller 266 (S440), and performs a recording operation on the information layer on which the movement has been made (S450).

Figure 5:
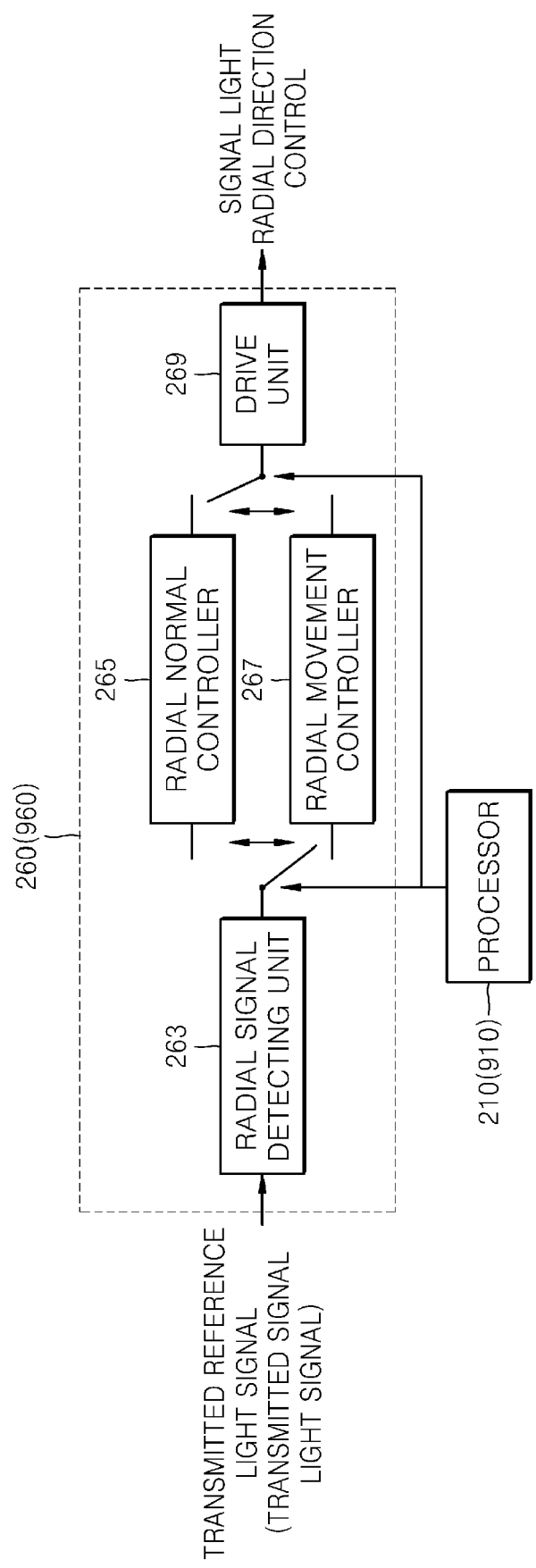
FIG. 5 is a block diagram of a radial control block in the holographic information recording/reproducing system of FIG. 1 according to another embodiment.
Figure 6:
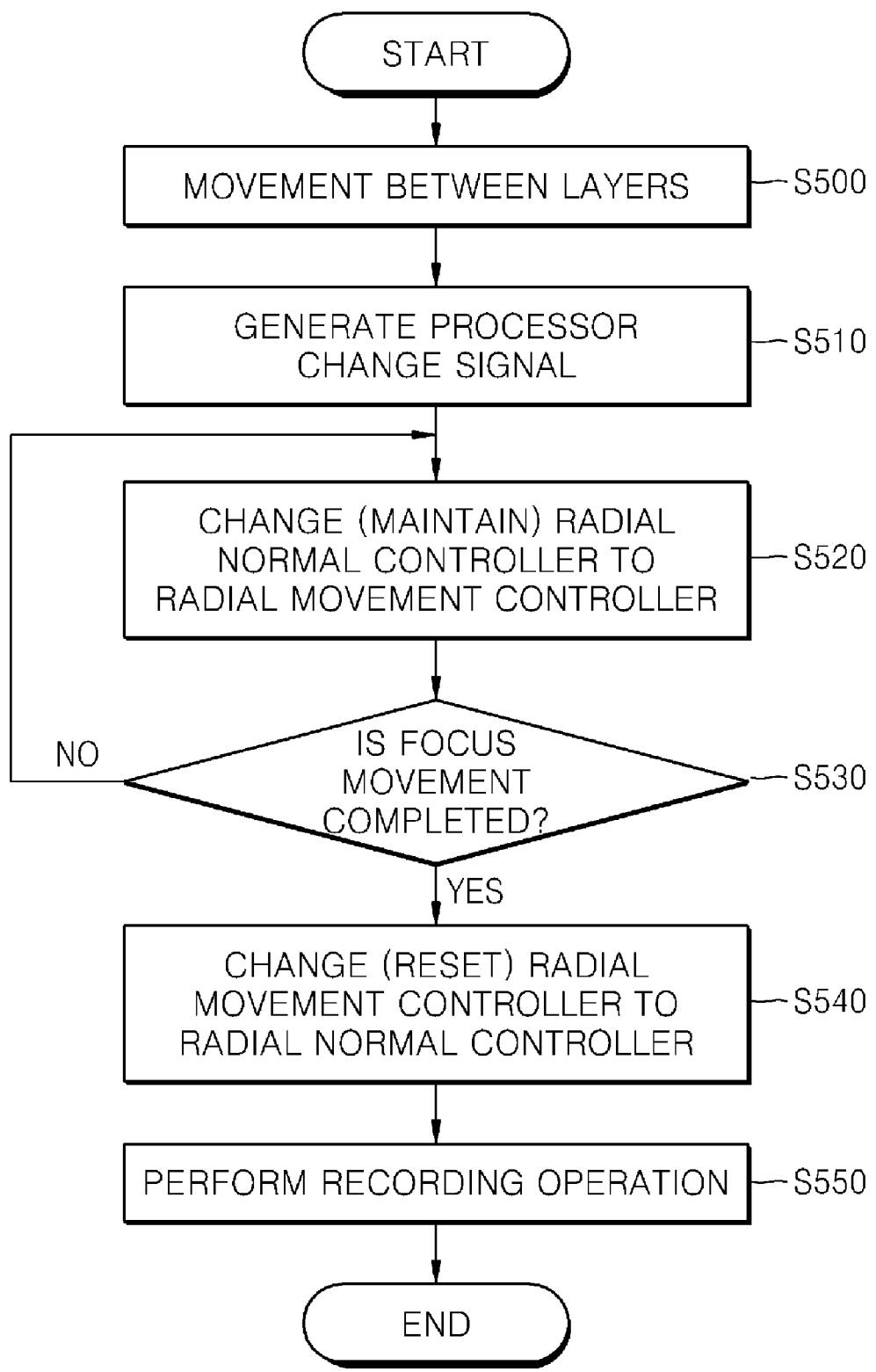
FIG. 6 is a flowchart illustrating a method of controlling a servo of a radial direction when the radial control block of FIG. 3 is used.

Next, the radial control block 260 according to another embodiment of the present invention is described with reference to FIGS. 5 and 6. FIG. 5 is a block diagram of a radial control block 260, and FIG. 6 is a flowchart illustrating a method of controlling a servo in a radial direction. Referring to FIG. 5, the radial control block 260 includes a radial signal detecting unit 263, a radial normal controller 265, a radial movement controller 267, and a drive unit 269. The radial signal detecting unit 263 detects a reference light signal that has passed through the holographic information storage medium 300 (of FIG. 1) to output a servo control signal in the radial direction. The radial signal detecting unit 263 inputs a servo control signal in the radial direction based on the transmitted reference light signal to the radial normal controller 265 while a recording operation is performed inside the same information layer. However, when movement between information layers is made during a recording mode, the processor 210 generates a change signal and performs a switching operation so that a signal output from the radial signal detecting unit 263 is input to the radial movement controller 267.

The radial normal controller 265 and the radial movement controller 267 control the drive unit 269 using a servo control signal in the radial direction detected by the radial signal detecting unit 263. The radial movement controller 267 is a controller that maintains a servo control state that exists immediately before movement between information layers. The radial movement controller 267 has a relatively lower gain value with respect to a servo control signal in the radial direction than the gain value of the radial normal controller 265, and has a relatively narrower control band. Since a disturbance component of a servo control signal that may occur during movement between information layers is mostly a high frequency component, the radial movement controller 267 is allowed to react insensitively to the disturbance component because of the lowering of the gain value and the narrowing of the control value. Like the radial normal controller 265, the radial movement controller 267 is a stable controller even when the gain value is low and the control band is narrow.

The drive unit 269 drives the objective lens 164 to perform a servo operation in the radial direction on the signal light. Stable movement between information layers can be stably performed without a reaction to a disturbance signal that may occur during movement by using the radial movement controller 266 during the movement between information layers.

Next, a radial direction servo control method is briefly described using the radial control block 260 according to FIGS. 5 and 6. When movement between information layers is made to change an information layer on which a recording operation is to be performed (S500), the processor 210 delivers a change signal containing between-movement information to the radial control block 260 (S510). The radial control block 260 that has received the change signal performs a switching operation such a radial direction servo control signal that has been input to the radial normal controller 265 is input to the radial movement controller 267 (S520). The switching operation is maintained until focus movement is completed (S530). Next, when the focus movement is completed, the radial control block 260 resets a signal output from the radial signal detecting unit 263 such that the signal is input to the radial normal controller 265 (S540), and performs a recording operation on the information layer on which the movement has been made (S550).

Figure 7:
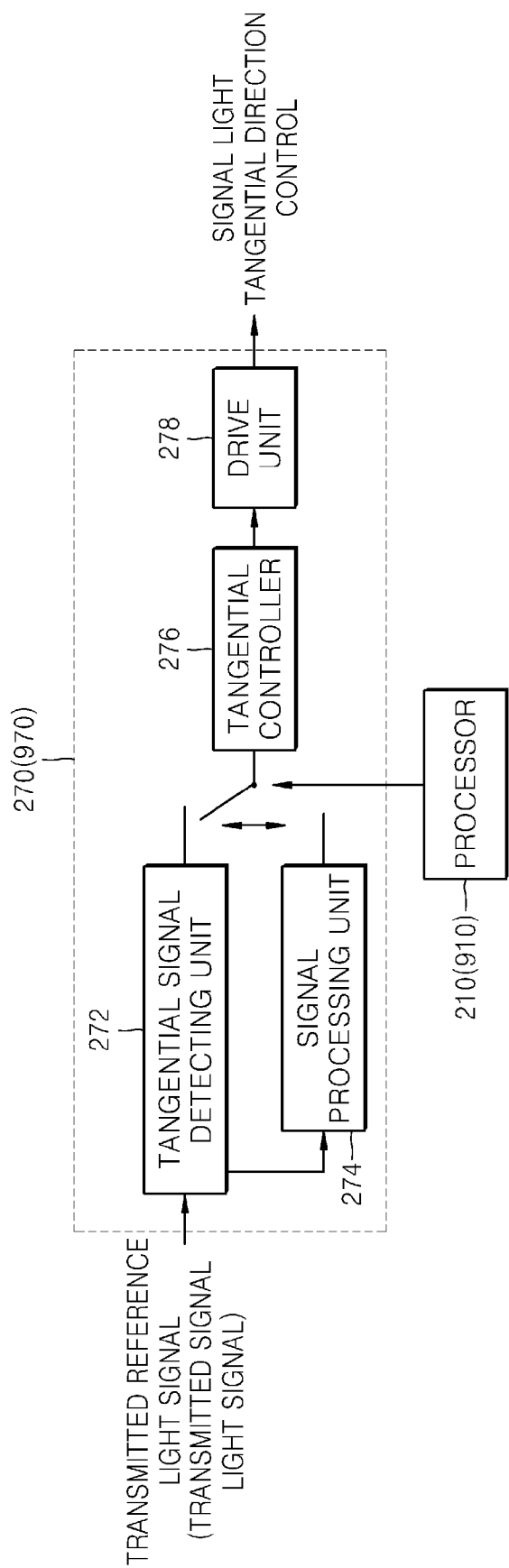
FIG. 7 is a block diagram illustrating a tangential control block in the holographic information recording/reproducing system of FIG. 1 according to an embodiment.
Figure 8:
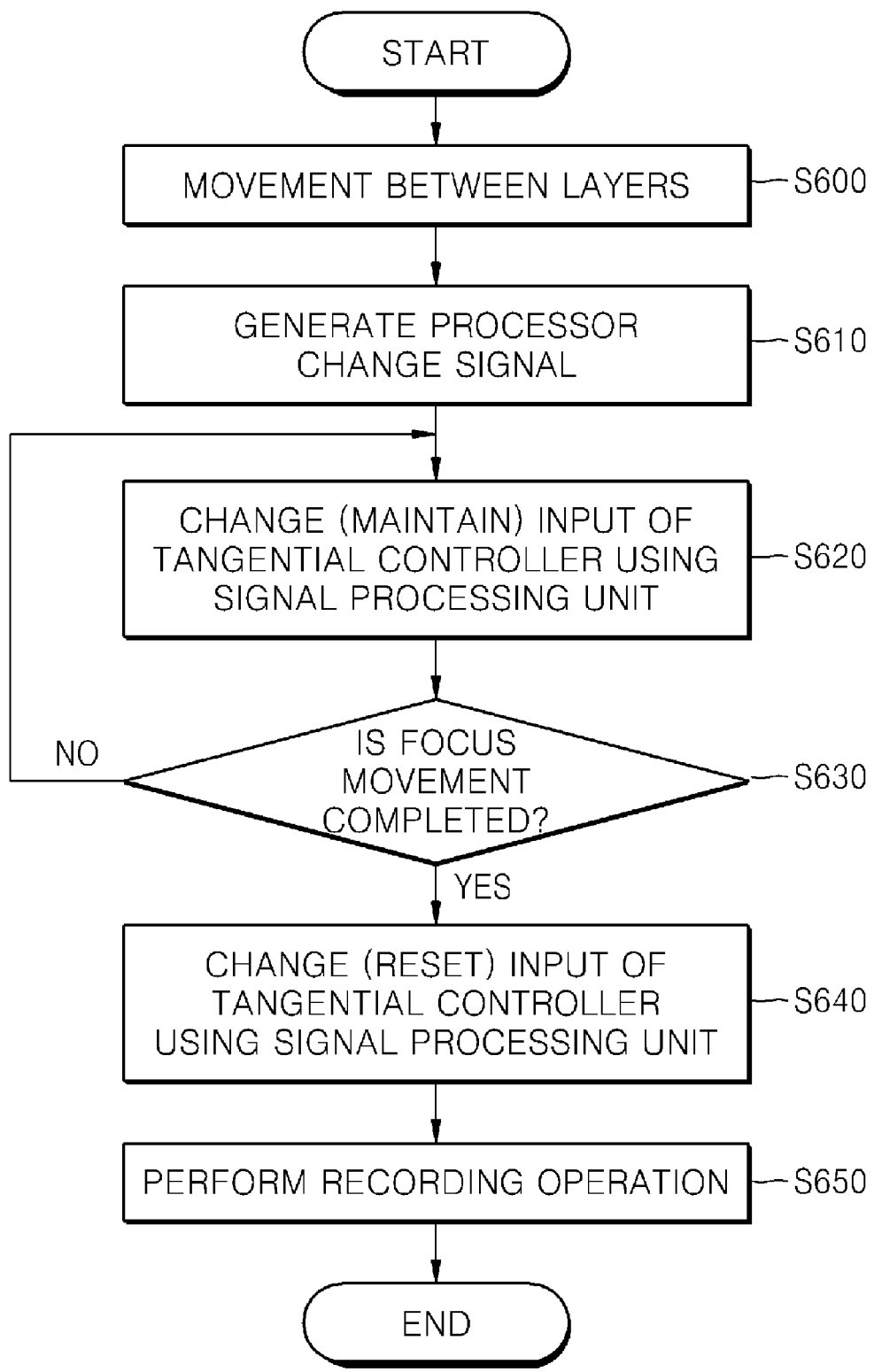
FIG. 8 is a flowchart illustrating a method of controlling a servo of a radial direction when the radial control block of FIG. 3 is used.

Next, the tangential control block is described with reference to FIGS. 7 and 8. FIG. 7 is a block diagram illustrating a tangential control block according to the embodiment, and FIG. 8 is a flowchart illustrating a method of controlling a servo of a tangential direction.

Referring to FIG. 7, the tangential control block 270 controls particularly the focus of signal light in the tangential direction when controlling the focus of the signal light to coincide with the focus of the reference light set in advance. The shown tangential control block 270 includes a tangential signal detecting unit 272, a signal processing unit 274, a tangential controller 276, and a drive unit 278, but is not limited thereto.

The tangential signal detecting unit 272 detects a reference light signal that has passed through the holographic information storage medium 300 (of FIG. 1) to output a servo control signal in the tangential direction. The tangential signal detecting unit 272 directly inputs a servo control signal in the tangential direction based on the transmitted reference light signal to the tangential controller 276 while a recording operation is performed within a single information layer. However, when movement between information layers on which a recording operation is to be made is performed, the movement of the reference light starts first. Since the movement of the reference light between the layers may involve a drastic signal change, a general tangential direction servo control signal based on the reference light may be directly influenced by disturbance. Therefore, when movement between information layers is made during a recording mode, the processor 210 generates a change signal and performs a switching operation so that a signal output from the tangential signal detecting unit 272 may be input to the tangential controller 276 via the signal processing unit 274.

The signal processing unit 274 converts a servo control signal of the tangential direction output from the tangential signal detecting unit 272 into a between-movement tangential direction servo control signal using a before-movement tangential direction servo control signal, and outputs the same. Herein, the term "between-movement tangential direction servo control signal" refers to a signal that maintains a servo control state that exists immediately before the movement between information layers. The between-movement tangential direction servo control signal can be a right-before-movement tangential direction servo control signal, or an average before-movement tangential direction servo control signal. The between-movement tangential direction servo control signal becomes a stable signal regardless of disturbance that may occur during movement between information layers.

Next, the tangential controller 276 controls the drive unit 278 using an input servo control signal. Since the tangential controller 276 receives a stable servo control signal even during movement between information layers, it can stably control the drive unit 278. The drive unit 278 drives the movable mirror 162 to perform a servo in the tangential direction of the signal light. Stable movement between information layers can be stably performed without a reaction to a disturbance signal that may occur during movement between information layers by using the signal processing unit 274 during the movement between the layers.

Next, a tangential direction servo control method is briefly described using the tangential control block 270 with reference to FIGS. 7 and 8.

When the focus of the reference light is moved between information layers to change an information layer on which a recording operation is to be performed (S600), the processor 210 delivers a change signal containing between-movement information to the tangential control block 270 (S610). The tangential control block 260 that has received the change signal performs a switching operation such that a signal output from the tangential signal detecting unit 272 is input to the tangential controller 276 via the signal processing unit 274 (S620). The switching operation is maintained until the focus movement is completed (S630). Next, when the focus movement is completed, the tangential control block 270 resets a signal output from the tangential signal detecting unit 272 such that the signal is directly input to the tangential controller 276 (S640), and performs a recording operation on the information layer on which the movement has been made (S650).

Figure 9:
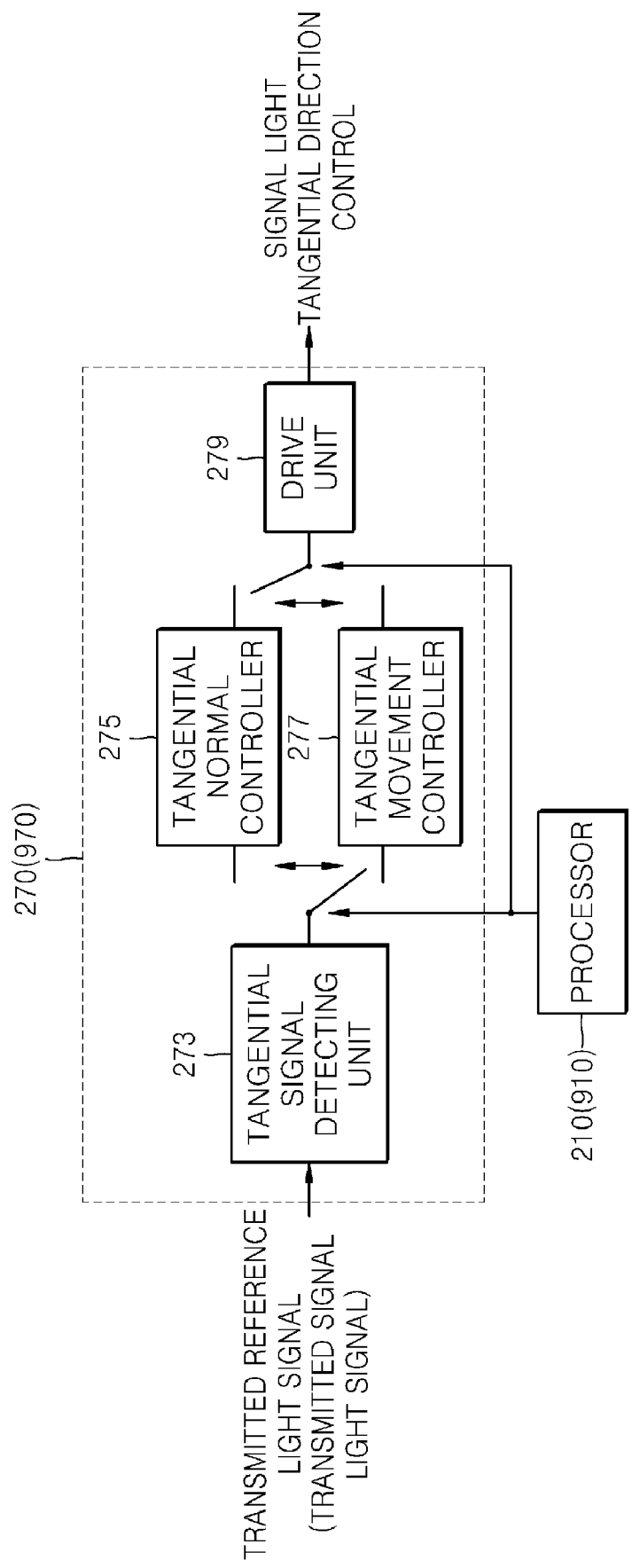
FIG. 9 is a block diagram of a tangential control block in the holographic information recording/reproducing system of FIG. 1 according to another embodiment.
Figure 10:
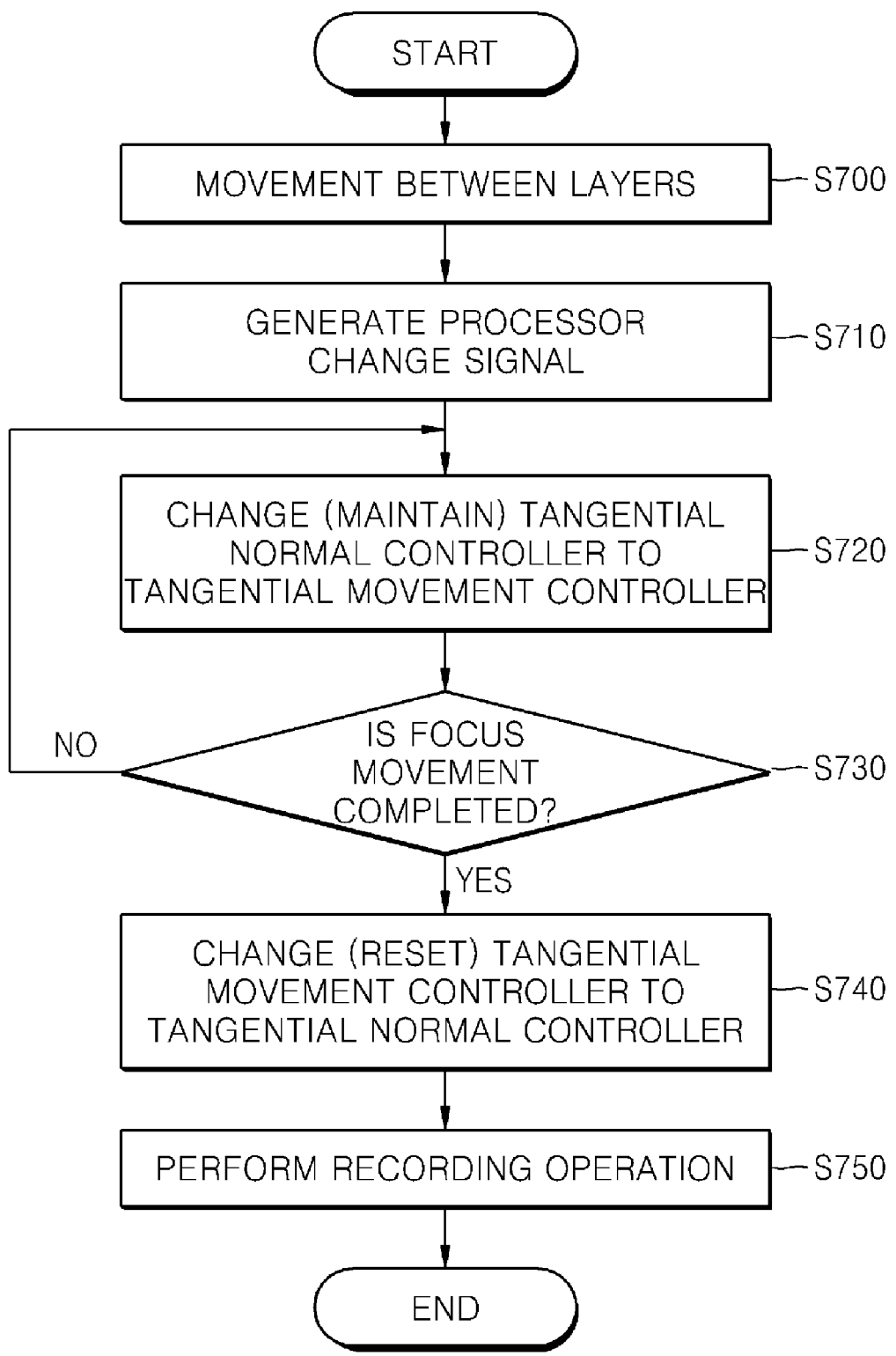
FIG. 10 is a flowchart illustrating a method of controlling a servo of a tangential direction when the radial control block of FIG. 5 is used.

Next, the tangential control block 270 according to another embodiment of the present invention is described with reference to FIGS. 9 and 10. FIG. 9 is a block diagram illustrating the tangential control block, and FIG. 10 is a flowchart explaining a method of controlling a servo in a tangential direction. Referring to FIG. 9, the tangential control block 270 includes a tangential signal detecting unit 273, a tangential normal controller 275, a tangential movement controller 277, and a drive unit 279.

The tangential signal detecting unit 273 detects a reference light signal that has passed through the holographic information storage medium 300 (of FIG. 1) to output a servo control signal in the tangential direction. The tangential signal detecting unit 273 inputs a servo control signal in the tangential direction based on the transmitted reference light signal to the tangential normal controller 275 while a recording operation is performed inside the same information layer. However, when movement between information layers is made during a recording mode, the processor 210 generates a change signal and performs a switching operation so that a signal output from the tangential signal detecting unit 273 is input to the tangential movement controller 277.

The tangential normal controller 275 and the tangential movement controller 277 control the drive unit 279 using a servo control signal in the tangential direction detected by the tangential signal detecting unit 273. The tangential movement controller 277 is a controller that maintains a servo control state that exists immediately before movement between information layers. The tangential movement controller 277 has a relatively lower gain value with respect to a servo control signal in the tangential direction than the gain value of the tangential normal controller 275, and has a relatively narrower control band. Since a disturbance component of a servo control signal that may occur during movement between information layers is mostly a high frequency component, the tangential movement controller 277 is allowed to react insensitively to the disturbance component because of the lowering of the gain value and the narrowing of the control value. Like the tangential normal controller 275, the tangential movement controller 277 is a stable controller even when the gain value is low and the control band is narrow.

The drive unit 279 drives the objective lens 164 to perform a servo in the tangential direction on the signal light. Stable movement between information layers can be stably performed without a reaction to a disturbance signal that may occur during movement by using the tangential movement controller 276 during the movement between information layers.

Next, a tangential direction servo control method is briefly described using the tangential control block 270 according to FIGS. 9 and 10.

When movement between information layers is made to change an information layer on which a recording operation is to be performed (S700), the processor 210 delivers a change signal containing between-movement information to the tangential control block 270 (S710). The tangential control block 270 that has received the change signal performs a switching operation such that a tangential direction servo control signal that has been input to the tangential normal controller 275 is input to the tangential movement controller 277 (S720). The switching operation is maintained until focus movement is completed (S730). Next, when the focus movement is completed, the tangential control block 270 resets a signal output from the tangential signal detecting unit 273 such that the signal is input to the tangential normal controller 275 (S740), and performs a recording operation on the information layer on which the movement has been made (S750).

Figure 11:
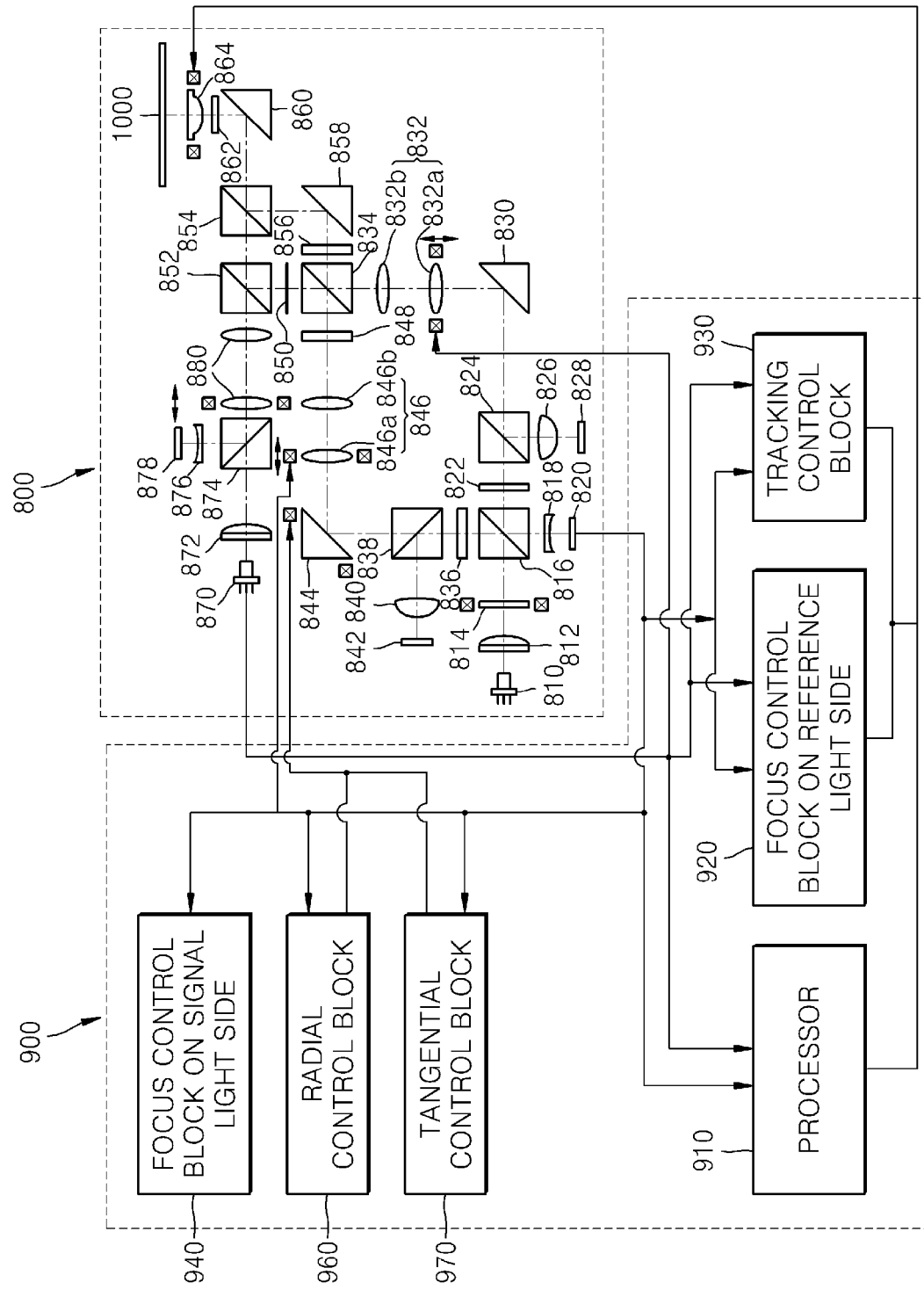
FIG. 11 is a schematic view of the construction of a holographic information recording/reproducing system according to another embodiment.
Figure 12:
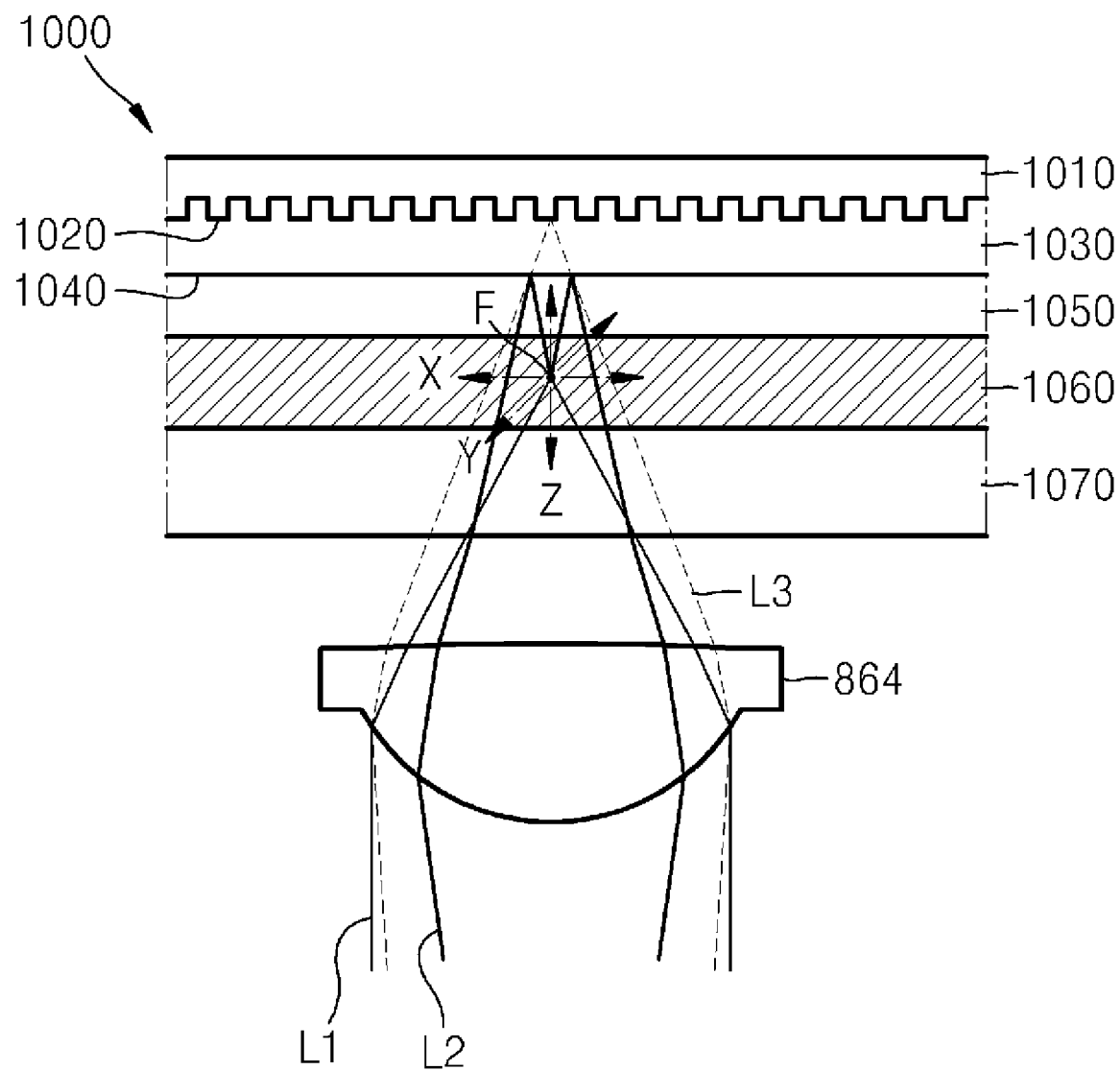
FIG. 12 is a reference view illustrating a servo according to a change in the focus positions of the reference light and the signal light in the holographic information recording/reproducing system.

FIG. 11 is a schematic view of the construction of a holographic information recording/reproducing system according to another embodiment of the present invention. FIG. 12 is a reference view explaining a servo according to a change in the focus positions of reference light and signal light in the holographic information recording/reproducing system of FIG. 11.

Referring to FIG. 11, the holographic information recording/reproducing system is an apparatus to record and/or reproduce information to/from a holographic information storage medium 1000, and includes a recording/reading optical system 800 that illuminates light onto a single side of the holographic information storage medium 1000 and receives the illuminated light, and a circuit unit 900.

Referring to FIG. 12, the holographic information storage medium 1000 used for the holographic information recording/reproducing system is a reflection type medium that includes a protection layer 1070, a holographic recording layer 1060, a space layer 1050, a reflection layer 1040, a buffer layer 1030, a servo layer 1020, and a substrate 1010. Directly focused reference light L1 and signal light L2 reflected by the reflection layer 1040 and focused form a focus in the holographic recording layer 1060 to perform a recording operation. The servo light L3 is reflected by the servo layer 1020. Particularly, the characteristic of the optical construction of the holographic information storage medium 1000 lies in the reflection layer 1040. The reflection layer 1040 can be a cholesteric liquid crystal reflection layer formed of a cholesteric liquid crystal in a liquid crystal state. Alternatively, a cured liquid crystal film may be used as the reflection layer 1040 of the holographic information storage medium 1000. A cholesteric liquid crystal has a structure wherein the directors of liquid crystal molecules are twisted in a spiral shape to reflect circularly polarized light corresponding to the spiral shape and transmit circularly polarized light corresponding to an opposite direction to the spiral shape. Accordingly, the cholesteric liquid crystal can separate light into two circularly polarized light beams perpendicular to each other, and allow the reflected light to maintain the original circular polarization. However, the present invention is not limited to the holographic information storage medium 1000 having the cholesteric liquid crystal reflection layer, but can be applied to the case where a general reflection layer is used by slightly modifying the optical construction of the embodiment.

The holographic information recording/reproducing system according to FIGS. 11 and 12 is the substantially same as the embodiment of the holographic information recording/reproducing system described with reference to FIG. 1, except that the holographic information recording/reproducing system is configured to be applied to the reflection type holographic information storage medium 1000 illustrated in FIG. 12. Therefore, the other elements such as the servo optical system are the substantially same as those of the previous embodiment, and elements relating to directing the light paths of the reference light and the signal light are configured to direct the reference light and the signal light onto a single side of the holographic information storage medium 1000 instead of onto opposite sides of the holographic information storage medium 300. Therefore, descriptions of members represented by the same names and performing the same functions as those of the holographic information recording/reproducing system described with reference to FIG. 1 are not repeated.

The recording/reading optical system 800 includes a first light source 810, a first collimating lens 812, a first polarization conversion device 814, a first polarization beam splitter 816, a recording/reproducing light detector 820, a movable mirror 844, a first focus control unit 832, a second polarization beam splitter 834, a second focus control unit 846, a third polarization device 848, a shutter 850, a wavelength selective beam splitter 852, a third polarization beam splitter 854, a second polarization conversion device 856, a quarter-wave plate 862, and an objective lens 864. While not required in all aspects, the shown recording/reading optical system 800 further includes a servo optical system including a second light source 870, a servo light polarization beam splitter 874, a servo light focus control unit 880, and a servo light detector 877 in order to read servo information. The recording/reading optical system 800 may further include a first polarization device 822 that detects the intensities of the reference light and the signal light during a recording operation, a reference beam splitter 824, a reference light detector 828, a second polarization device 836, a signal beam splitter 838, and a signal light detector 842. Reference numerals 812 and 872 represent collimating lenses that collimate light into parallel light. Reference numerals 828, 826, 840, and 876 represent lenses that facilitate light detection. Reference numerals 830, 858, and 860 represent mirrors bend a light path.

The first light source 810 emits light linearly polarized in one direction for recording/reproducing operations. The light for the recording/reproducing operations emitted from the first light source 810 is modulated and emitted during a recording mode, and emitted without modulation during a reproducing mode. The first polarization conversion device 814 can be a rotatable half-wave plate or a liquid crystal type active half-wave plate. The first polarization device 822, the reference beam splitter 824, and the reference light detector 828 form a recording power detecting unit of the reference light. The second polarization device 836, the signal beam splitter 838, and the signal light detector 842 form a recording power detecting unit of the signal light.

The recording/reproducing light detector 820 detects recording/reproducing light reflected by the holographic information storage medium 1000. The detected signal can be used for a servo control during recording/reproducing operations. Data can be read from a signal detected during a reproducing operation.

The first focus control unit 832 can be an active type relay lens unit including a plurality of lenses 832$a$ and 832$b$. The second focus control unit 846 can also be an active type relay lens unit including a plurality of lenses 846$a$ and 846$b$. The first and second focus control units 832 and 846 are disposed on the light paths of the branching reference light and signal light, respectively, to allow the foci of the reference light and signal light to be formed at different positions in the depth direction inside the holographic information storage medium 1000.

The movable mirror 844 is a two-axis driven mirror that can minutely rotate to control the radial direction and the tangential direction of the reference light, and is controlled by the radial control block 960 or the tangential control block 970. The movable mirror 844 is not limited to the two-axis driven mirror, but the same function can be performed using two one-axis mirrors.

The third polarization device 848, the second polarization beam splitter 834, the shutter 850, the wavelength selective beam splitter 852, the third polarization beam splitter 854, and the second polarization conversion device 856 separate the light paths of the reference light and signal light reflected by the holographic information storage medium using polarization to enhance use efficiencies of the reference light and signal light. The third polarization device 848 may be a half-wave plate. The third polarization device 848 changes s-polarized light into p-polarized light and vice versa. The second polarization conversion device 856 may be an active type half-wave plate. The second polarization conversion device 856 serves as a half-wave plate during a recording mode, and does not serve as a half-wave plate during a reproducing mode. It is possible to allow a portion of incident light to maintain an original polarization state by allowing the optical axis of the half-wave plate to slightly deviate from 45 degrees with respect to the polarization direction of incident light during a recording mode. In this case, a portion of reflected signal light is not polarized while passing through the second polarization conversion device 856, and is reflected by the second polarization beam splitter 834, reverses the light path of the reference light toward the first polarization beam splitter 816, and can be detected by the recording/reproducing light detector 820. Like the shutter 148 of FIG. 1, the shutter 850 is closed while the foci of the reference light and the signal light are controlled using the reference light before a recording operation is performed, so that only reflected light of the signal light is detected through the recording/reproducing light detector 820.

The quarter-wave plate 862 changes linearly polarized light into circularly polarized light and vice versa. As described above, since the holographic information storage medium 1000 maintains the polarization direction of circular polarization and reflects the light, the polarization directions of reference light and signal light incident from the third polarization beam splitter 854 to the quarter-wave plate 862 are the same as those of reference light and signal light reflected from the quarter-wave plate 862 to the third polarization beam splitter 854.

Next, the servo control unit (circuit unit) 900 of FIG. 11 will be described below. The servo control unit 900 includes a processor 910, a focus control block 920 for the reference light, a tracking control block 930, a focus control block 940 for the signal light, a radial control block 960, and a tangential control block 970.

The processor 910 controls a static servo using a detection signal input from the servo light detector 978. The processor 910 controls an object lens 864 and a servo light focus control unit 880 so that the focus of the servo light is formed on the servo layer 1020 (of FIG. 12) inside the holographic information storage medium 1000. Also, the processor 910 controls the objective lens 864 to be located on a correct track position inside the holographic information storage medium 1000 using servo information obtained from servo light, and controls the first and second focus control units 832 and 846 so that the foci of reference light and signal light are formed on a position from which recording/reproducing operations are to be performed.

Despite a servo control of the processor 910 using the servo light, a dynamic servo control is desirable to correct dynamic movements such as various forms of shaking that may occur while the holographic information storage medium 1000 rotates.

Each control block according to the embodiment of FIG. 11 (i.e., blocks 920, 930, 940, 960, 970) obtains a signal for a dynamic servo control from signal light reflected by the holographic information storage medium 1000 after illumination onto the holographic information storage medium 1000. At this point, the shutter 850 is closed to block reference light so that the recording/reproducing light detector 820 can exclude interference by a signal of reference light under the dynamic circumstance. Since the power of the signal light is for a servo function, the light power of the signal light is set to be lower than light power required for a recording operation.

The focus control block 920 for the reference light detects the signal light reflected by the holographic information storage medium 1000 through the recording/reproducing light detector 820, and controls the first focus control unit 832 to control the focus of the reference light to be formed on a recording/reproducing position inside the holographic information storage medium 1000 using the detected signal light.

The tracking control block 930 controls the objective lens 864 to correctly trace a track to be read inside the holographic information storage medium 1000. For this purpose, the tracking control block 930 obtains a servo error signal as to how much the reference light deviates from a track on which a recording operation is to be performed from the reference light reflected by the holographic information storage medium 1000, and performs a tracking operation using the obtained servo error signal.

The focus control block 940 for the signal light controls the second focus control unit 846 to control the focus of signal light to coincide with that of reference light on the basis of a signal light signal reflected by the holographic information storage medium 1000.

The radial control block 960 controls the movable mirror 844 on the basis of the signal light reflected by the holographic information storage medium 1000 to perform a radial direction servo on signal light. The tangential control block 970 controls the movable mirror 844 on the basis of a signal light signal that has passed through the holographic information storage medium 1000 to perform a tangential direction servo on signal light.

Next, the servo operation of the holographic information recording/reproducing system according to FIG. 11 is described. The shutter 850 is closed while the servo operation is performed. The second light source 870 illuminates the servo light before a recording operation is performed, and the servo light reflected by the servo light detector 878 is detected, so that a static servo controlling the focus of servo light and performing a tracking operation is performed. Next, the first light source 810 is driven and a dynamic servo controlling the foci of reference light and signal light is performed to cope with the dynamic movement of the holographic information storage medium 1000. Since the optical system of single side illumination is used in the embodiment, a focus control can be performed using one of the reference light and the signal light. This embodiment is the substantially same as that of the embodiment described with reference to FIG. 1 with a difference that the light path is different. Since the shutter 850 is disposed on the light path of reference light in the embodiment, the dynamic servo control is performed using signal light, which is different from the case described with reference to FIG. 1.

The signal light branching from the first polarization beam splitter 816 is reflected by the holographic information storage medium 1000, and the reflected signal light is detected through the recording/reproducing light detector 820. A portion of incident light can be maintained to have original polarization by allowing the optical axis of the half-wave plate of the second polarization conversion device 856 to slightly deviate from 45 degrees with respect to the polarization direction of incident light as described above. In this case, a portion of the signal light reflected by the holographic information storage medium 1000 is not polarized while passing through the second polarization conversion device 856, and is reflected by the second polarization beam splitter 834, reverses the light path of the signal light toward the first polarization beam splitter 816, and can be detected by the recording/reproducing light detector 820. The dynamic servo control controlling the foci of reference light and signal light using the first and second focus control units 832 and 846, and the movable mirror 844 is performed by using information of signal light detected through the above process. That is, the focus position of reference light in the depth direction is set to a recording/reproducing position through the first focus control unit 832, and then the focus position of signal light in the depth direction is set to the focus of the reference light by controlling the second focus control unit 846. Furthermore, the focus position of signal light in the radial direction and the tangential direction is set to the focus of the reference light through the movable mirror 844.

In the above-described dynamic servo, a servo control is maintained at a right-before-movement servo control state during movement between information layers particularly, so that a servo can be stably performed during movement between information layers. The dynamic servo control is the substantially same as the radial direction servo control and the tangential direction servo control described with reference to FIGS. 3 through 10 with the difference that a signal input to the signal detecting unit is a reflected signal light signal.

For example, as described with respect to FIG. 3, the radial control block 960 according to the embodiment of FIG. 11 controls particularly the focus of signal light in the radial direction when controlling the focus of the signal light to coincide with the focus of the reference light set in advance. The radial control block 960 may include a radial signal detecting unit 262, a signal processing unit 264, a radial controller 266, and a drive unit 268. The radial signal detecting unit 262 detects a signal light signal reflected by the holographic information storage medium 1000 (of FIG. 12) to output a radial direction servo control signal. The radial signal detecting unit 262 directly inputs a radial direction servo control signal based on a transmitted signal light signal to the radial controller 266 while a recording operation is performed within a single information layer. When movement between information layers is made during a recording operation, the signal processing unit 264 that has received a change signal from the processor 910 converts a radial direction servo control signal output from the radial signal detecting unit 262 into a between-movement radial direction servo control signal using a before-movement radial direction servo control signal, and outputs the same. Herein, the term "between-movement radial direction servo control signal" refers to a signal that maintains a servo control state that exists immediately before movement between information layers. The between-movement radial direction servo control signal can be a right-before-movement radial direction servo control signal, or an average before-movement radial direction servo control signal. The between-movement radial direction servo control signal becomes a stable signal regardless of disturbance that may occur during movement between information layers. Next, the radial controller 266 controls the drive unit 268 using an input servo control signal. Since the radial controller 266 receives a stable servo control signal even during movement between information layers, it can stably control the drive unit 268. The drive unit 268 drives the movable mirror 844 to perform a radial direction servo on signal light. Stable movement between information layers can be stably performed without a reaction to a disturbance signal that may occur during movement between information layers by using the signal processing unit 264 during the movement between the layers.

FIG. 5 illustrates a block diagram of a radial control block 960 according to another embodiment of the present invention. Referring to FIG. 5, the radial control block 960 includes a radial signal detecting unit 263, a radial normal controller 265, a radial movement controller 267, and a drive unit 269. Since this construction is the substantially same as the construction described with reference to FIGS. 5 and 6 with differences that the radial signal detecting unit 263 receives a reflected signal light signal, and the drive unit 269 controls the movable mirror 844 to control a radial direction servo, a detailed description thereof is not repeated.

Referring to FIG. 7, a tangential control block 970 (270) controls particularly the focus of the signal light in the tangential direction when controlling the focus of the signal light to coincide with the focus of the reference light set in advance. The tangential control block 970 may include a tangential signal detecting unit 272, a signal processing unit 274, a tangential controller 276, and a drive unit 278. Since this construction is the substantially same as the construction described with reference to FIGS. 7 and 8 with differences that the tangential signal detecting unit 272 receives a reflected signal light signal, and the drive unit 278 controls the movable mirror 844 to control a tangential direction servo, a detailed description thereof is not repeated.

FIG. 9 is a block diagram of a tangential control block 970 according to another embodiment of the present invention. Referring to FIG. 9, the tangential control block 970 includes a tangential signal detecting unit 273, a tangential normal controller 275, a tangential movement controller 277, and a drive unit 270. Since this construction is the substantially same as the construction described with reference to FIGS. 9 and 10 with differences that the tangential signal detecting unit 273 receives a reflected signal light signal, and the drive unit 270 controls the movable mirror 844 to control a tangential direction servo, a detailed description thereof is not repeated.

Although a servo controlling apparatus according to the above-described embodiments has been explained using the system including both the radial control block and the tangential control block, the servo controlling apparatus according to aspects of the present invention may be a servo controlling apparatus that controls either a radial direction servo or a tangential direction servo that causes a serious servo error under a dynamic circumstance, and the servo controlling apparatus may include only one of a radial control block and a tangential control block.

Aspects of the invention can also be embodied as computer-readable codes on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices. Aspects of the present invention may also be implemented through carrier waves (such as data transmission through the Internet). The computer-readable recording medium can also be distributed over network-coupled computer systems so that the computer-readable code is stored and executed in a distributed fashion. Also, functional programs, codes, and code segments for accomplishing the present invention can be easily construed by programmers skilled in the art to which the present invention pertains.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A servo controlling apparatus of a holographic information recording/reproducing system that changes a foci of a reference light and a signal light in a depth direction of a holographic information storage medium to record information over a plurality of information layers, the servo controlling apparatus comprising:
   a servo signal detecting unit that detects a servo signal; and
   a signal processing unit that outputs a between-movement servo control signal during the movement between the plurality of information layers using a before-movement servo signal detected by the servo signal detecting unit before the movement between the plurality of information layers;
   a low pass filter that averages before-movement servo control signals; and
   a memory unit that stores an average before-movement servo control signal obtained by the low pass filter,
   wherein the servo controlling apparatus changes a servo control from a normal servo operation to a between-movement servo operation while a movement between the plurality of information layers is made during a recording operation, and changes the servo control back to the normal servo operation when the movement between the plurality of information layers is completed, wherein the signal processing unit processes an average before-movement servo control signal as the between-movement servo control signal, and wherein the servo controlling apparatus, in the between-movement servo operation maintains a servo control state based on the average before-movement servo control signal.

2. The servo controlling apparatus of claim 1, comprising:
a servo signal detecting unit that detects a servo signal; and
a servo control unit that controls a servo operation using the servo signal detected by the servo signal detecting unit, the servo control unit comprising a normal controller that controls a servo operation within a single information layer during a recording operation, and a between-movement controller that controls a servo operation during the movement between the plurality of information layers.

3. The servo controlling apparatus of claim 2, wherein the between-movement controller has a lower gain value than that of the normal controller.

4. The servo controlling apparatus of claim 2, wherein the between-movement controller has a narrower control band than that of the normal controller.

5. The servo controlling apparatus of claim 4, wherein the between-movement controller has a lower gain value than that of the normal controller.

6. The servo controlling apparatus of claim 1, wherein the servo control is for the signal light.

7. The servo controlling apparatus of claim 1, wherein the servo control is in a radial direction.

8. The servo controlling apparatus of claim 1, wherein the servo control is in a tangential direction.

9. The servo controlling apparatus of claim 8, wherein the servo control is in a radial direction and a tangential direction.

10. A holographic information recording/reproducing system, comprising:
an optical reading/recording system that changes a foci of a reference light and a signal light in a depth direction of a holographic information storage medium to record information over a plurality of information layers; and
a servo controlling apparatus including a servo control unit that controls a radial and/or tangential positioning of the foci of the reference light and the signal light, the servo control unit comprising a normal controller that controls a servo operation within a single information layer during a recording operation, and a between-movement controller that controls a servo operation during a movement between the plurality of information layers,
wherein the servo controlling apparatus further comprising:
a servo signal detecting unit that detects a servo signal; and
a signal processing unit that outputs a between-movement servo control signal during the movement between the plurality of information layers using a before-movement servo signal detected by the servo signal detecting unit before the movement between the plurality of information layers,
wherein the signal processing unit processes an average before-movement servo control signal as the between-movement servo control signal, and
wherein the between-movement controller, in the between-movement servo operation, maintains a servo control state based on the average before-movement servo control signal.

11. A servo controlling method of a holographic information recording/reproducing system that changes a foci of a reference light and a signal light in a depth direction of a holographic information storage medium to record information over a plurality of information layers, the method comprising:
changing a servo control from a normal servo operation to a between-movement servo operation when a movement between the plurality of information layers is made during a recording operation, and
changing the servo control back to the normal servo operation when the movement between the plurality of information layers is completed;
determining whether movement between the plurality of information layers is made during the recording operation; and
outputting a between-movement servo control signal using a before-movement servo signal while movement between the plurality of information layers is made during the recording operation,
wherein the outputting of the between-movement servo control signal comprises:
averaging and storing a before-movement servo control signal outputted before the movement between the plurality of information layers; and
processing the stored average before-movement servo control signal as the between-movement servo control signal, and
wherein a servo control state in the between-movement servo operation is maintained based on the average before-movement servo control signal.

12. The method of claim 11, wherein the between-movement servo operation has a lower gain than that of the normal servo operation, and has a narrower control band than that of the normal servo operation.

13. The method of claim 11, wherein the servo control is for the signal light.

14. The method of claim 11, wherein the servo control is in a radial direction.

15. The method of claim 11, wherein the servo control is in a tangential direction.

16. The method of claim 15, wherein the servo control is in the radial direction and a tangential direction.

17. A non-transitory computer readable medium encoded with processing instructions for implementing the method of claim 11 using one or more processors.

* * * * *